US006862116B2

(12) United States Patent
Ogino

(10) Patent No.: US 6,862,116 B2
(45) Date of Patent: Mar. 1, 2005

(54) DOCUMENT SCANNING APPARATUS AND DOCUMENT SCANNING METHOD FOR SEQUENTIALLY SCANNING DOCUMENTS AND GENERATING IMAGE DATA CORRESPONDING TO THESE DOCUMENTS

(75) Inventor: Noboru Ogino, Machida (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 669 days.

(21) Appl. No.: 09/754,740

(22) Filed: Jan. 4, 2001

(65) Prior Publication Data

US 2002/0051241 A1 May 2, 2002

(30) Foreign Application Priority Data

Jan. 14, 2000 (JP) ........................................ 2000-006646

(51) Int. Cl.$^7$ ................................................ H04N 1/04
(52) U.S. Cl. ........................ 358/474; 358/496; 358/497; 358/498
(58) Field of Search ................................ 358/474, 496, 358/497, 498

(56) References Cited

U.S. PATENT DOCUMENTS 4,210,818 A * 7/1980 Green et al. ........... 250/559.02
5,299,021 A    3/1994 Gartner
5,555,099 A    9/1996 Telle
6,002,849 A * 12/1999 Koh et al. .................. 358/1.18
6,122,457 A * 9/2000 Kizaki ......................... 399/11

FOREIGN PATENT DOCUMENTS

| EP | 0465 166 A2 | 1/1992 |
| EP | 0 725 528 A1 | 8/1996 |
| EP | 0 777 374 A2 | 6/1997 |
| EP | 0 833 210 A2 | 4/1998 |
| JP | 7-110530 | 4/1995 |
| JP | 11-27507 | 1/1999 |

* cited by examiner

Primary Examiner—Edward Coles
Assistant Examiner—Houshang Safaipour
(74) Attorney, Agent, or Firm—Frishauf, Holtz, Goodman & Chick, P.C.

(57) ABSTRACT

An image sensor scans a document which is transported by an image sensor drive mechanism section and is placed on a document glass plane. At this time, an ADF scan operation is performed when a document transport mechanism section is used for transporting documents. Otherwise, a manual-feed scan operation is performed. A CPU accepts a specification whether to scan the next document each time an ADF or manual-feed scan operation terminates. When an operation to scan the next document is specified, the ADF or manual-feed scan operation is performed. The ADF or manual-feed scan operation generates image data until a specification is issued to complete document scanning. The CPU uses image memory to store the generated image data corresponding to each page in a series of documents arranged in the order of scanning.

9 Claims, 8 Drawing Sheets

1

DOCUMENT SCANNING APPARATUS AND DOCUMENT SCANNING METHOD FOR SEQUENTIALLY SCANNING DOCUMENTS AND GENERATING IMAGE DATA CORRESPONDING TO THESE DOCUMENTS

CROSS-REFERENCE TO RELATED APPLICATIONS

This application is based upon and claims the benefit of priority from the prior Japanese Patent Application No. 2000-006646, filed Jan. 14, 2000, the entire contents of which are incorporated herein by reference.

BACKGROUND OF THE INVENTION

The present invention relates to a document scanning apparatus which is used in a device such as a digital compound machine for scanning documents.

Some types of this apparatus are provided with an ADF (Auto Document Feeder) scan function and a manual-feed scan function.

The ADF scan function uses an image sensor to scan documents placed in a document tray by feeding one document after another. This function is useful for scanning a series of sheets of paper. The manual-feed scan function allows a user to move an image sensor across a document placed on a document glass plane for scanning this the document. The manual-feed scan function is convenient for scanning like a book document. A user can scan various types of documents by using proper scan functions appropriate for documents to be scan.

When a document scanning apparatus is provided with both the ADF scan function and the manual-feed scan function, these functions are performed for scanning documents as entirely different jobs. A user may successively scan documents by using the ADF scan function and the manual-feed scan function as a series of operations. In this case, separate jobs perform these operations. Scanned image data is managed differently.

There may be the case where a new series of documents is to be created by combining copied documents from a plurality of sheet documents with copied documents from a book document. A user needs to separately copy a series of sheet documents using the ADF scan function, copy the book document using the manual-feed scan function, and manually sort output copied documents.

When a copied book document is added after a copied sheet document, or vice versa, it is possible to eject copied documents in an intended order by arranging the order of documents to be copied, eliminating the need for manually rearranging the copied documents.

However, there may be the case where a plurality of copies is created without using a mechanical sorter. In this case, it is impossible to eject copied documents for eliminating the need to manually rearrange the copied documents even if the order of documents to be copied is arranged.

Incidentally, there is also a document scanning apparatus which is provided with either the ADF scan function or the manual-feed scan function only.

Such an apparatus causes no problem in using the ADF scan function and the manual-feed scan function according to needs. However, this apparatus switches between jobs according to a change in scan conditions such as a scan density. When a user successively scans documents by changing a scan condition, scan operations are performed as different jobs before and after the scan condition is changed. Further, scanned image data is managed differently.

BRIEF SUMMARY OF THE INVENTION

It is an object of the present invention to allow a single job to perform scan operations for generating image data by using the ADF scan function and the manual-feed scan function in any combination.

It is another object of the present invention to allow a single job to perform scan operations for generating image data by changing scan conditions.

These objects are implemented by an image scanning apparatus as described below.

A document scanning apparatus for scanning a document, generating image data, and storing this image data in specified storage means, comprising:

first scanning means for sequentially transporting documents mounted in a specified document tray to a specified scan position and scanning the document at the scan position;

second scanning means for scanning a document placed on a specified document glass plane without transporting this document;

continued specification acceptance means for accepting a specification for document scan continuation or completion after one of scan operations for all documents mounted in the document tray through the first scanning means and for the document placed on the document glass plane through the second scanning means;

scan method selection means for responding to an acceptance of continued document scan specification by this continued specification acceptance means, selecting the first scanning means or the second scanning means according to a specified specification, and allowing selected scanning means to start scanning documents; and storage control means for storing generated image data as for a series of documents in the storage means, wherein a scan operation by the first scanning means and the second scanning means generates image data until the continued specification acceptance means accepts a specification to complete scanning documents.

The above-mentioned objects can also be implemented by a document scanning apparatus as described below.

A document scanning apparatus for scanning a document, generating image data, and storing this image data in specified storage means, comprising:

scanning means for scanning the document;

continued specification acceptance means for accepting a specification for document scan continuation or completion after termination of scanning of the document by this scanning means;

conditional specification acceptance means which accepts a specification of a specified scan condition when this continued specification acceptance means awaits a specification whether to continue scanning documents;

continued scan control means which allows the scanning means to start scanning documents under a scan condition updated by a specification most recently accepted by the conditional specification acceptance means in response to acceptance of a specification to continue scanning documents by the continued specification acceptance means; and storage control means for storing generated image data as for a series of documents in the storage means, wherein a scan operation by the scanning means generates image data until the continued specification acceptance means accepts a specification to complete scanning documents.

The above-mentioned objects can also be implemented by a document scanning method as described below.

A document scanning method of scanning a document, generating image data, and storing this image data in specified storage means by selectively using first scanning means for sequentially transporting documents mounted in a specified document tray to a specified scan position and scanning the document at the scan position and second scanning means for scanning a document placed on a specified document glass plane without transporting this document, comprising the steps of:

accepting a specification for document scan continuation or completion after one of scan operations for all documents mounted in the document tray through the first scanning means and for the document placed on the document glass plane through the second scanning means;

responding to an acceptance of the continued document scan specification, selecting the first scanning means or the second scanning means according to a specified specification, and allowing selected scanning means to start scanning documents; and storing generated image data as for a series of documents in the storage means, wherein a scan operation by the first scanning means and the second scanning means generates image data until acceptance of the specification to complete scanning documents.

The above-mentioned objects can also be implemented by a document scanning method as described below.

A document scanning method for scanning a document, generating image data, and storing this image data in specified storage means by using specified scanning means, comprising the steps of:

accepting a specification for document scan continuation or completion after termination of scanning of the document by the scanning means;

accepting a specification of a specified scan condition while awaiting the specification whether to continue scanning documents;

allowing the scanning means to start scanning documents under a scan condition updated by a specification most recently accepted by the conditional specification acceptance means in response to acceptance of the specification to continue scanning documents; and storing generated image data as for a series of documents in the storage means, wherein a scan operation by the first scanning means and the second scanning means generates image data until acceptance of the specification to complete scanning documents.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of a digital compound machine which uses a document scanning apparatus according to the present invention will be described in further detail with reference to the accompanying drawings.

(First Embodiment)

Figure 1:
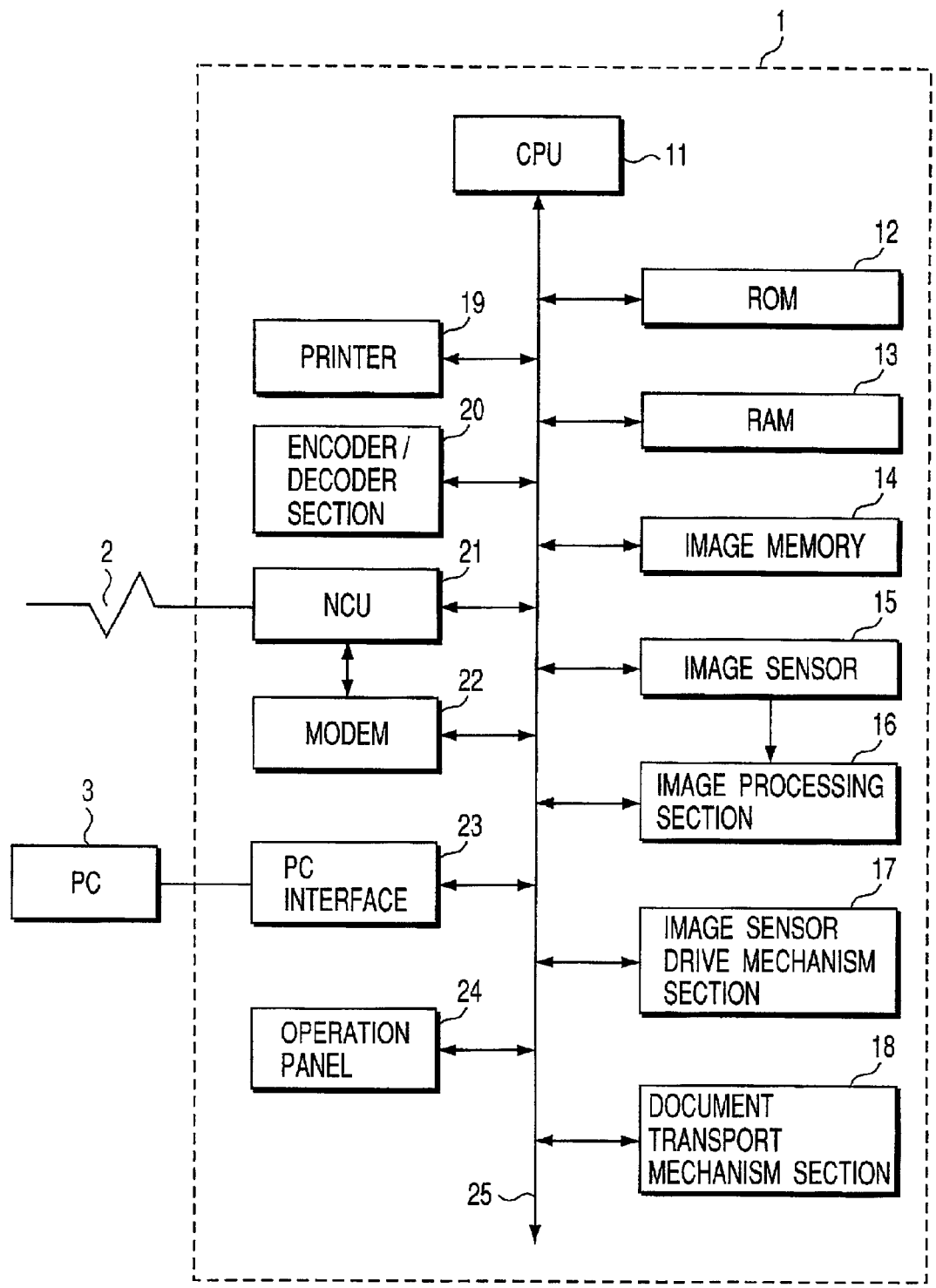
FIG. 1 is a block diagram showing a partial configuration of a first embodiment of a digital compound machine which uses a document scanning apparatus according to the present invention.

FIG. 1 is a block diagram showing a partial configuration according to this embodiment of a digital compound machine.

In this figure, the digital compound machine according to this embodiment is enclosed in a broken line and is marked with numeral 1.

As shown in this figure, a digital compound machine 1 according to this embodiment comprises a CPU 11, ROM 12, RAM 13, image memory 14, an image sensor 15, an image processing section 16, an image sensor drive mechanism section 17, a document transport mechanism section 18, a printer 19, a encoder/decoder section 20, a network control unit (NCU) 21, a modem 22, a personal computer interface (hereafter referred to as the PC interface) 23, and an operation panel 24. These components are connected to each other via a system bus 25 to configure the digital compound machine.

The CPU 11 implements digital compound machine operations by performing control processing for centrally controlling each component of the digital compound machine based on a control program stored in the ROM 12.

The ROM 12 stores the control program and the like.

The RAM 13 is used for storing various information the CPU 11 uses to process data in various ways.

The image memory 14 stores image data associated with image data processing such as sending and receiving data, scanning or printing images.

The image sensor 15 comprises, say, a CCD line sensor and generates an image signal by means of horizontal scanning for a document placed on a document glass plane (not shown).

The image processing section 16 is connected to the image sensor 15. The image processing section 16 generates image data by applying various correction processing such as digitization, shading correction, darkness correction, and the like to an image signal generated from the image sensor 15.

The image sensor drive mechanism section 17 reciprocates the image sensor 15 along the document glass plane for vertical scanning.

The document transport mechanism section 18 transports documents one sheet at a time from a document tray (not shown) onto the document glass plane.

The printer 19 prints an image corresponding to the image data on printing paper.

The encoder/decoder section 20 compresses and encodes image data and decodes the compressed and encoded image data.

The NCU 21 connects to a PSTN line 2 provided in a PSTN (Public Switched Telephone Network). The NCU 21 provides the connected PSTN line 2 with state monitoring, call origination to a network, and the like. The NCU 21 equalizes a facsimile transmission signal transmitted to the PSTN line 2 and sets a level for this signal.

The modem 22 is connected to the NCU 21. The modem 22 modulates image data and control data for generating a facsimile transmission signal and a control signal to be sent to the PSTN line 2. The modem 22 demodulates the facsimile transmission signal and the control signal received via the PSTN line 2 for reproducing the image data or the control data.

The PC interface 23 connects with a personal computer (PC) 3 by means of, say, a cable. The PC interface 23 exchanges control commands and image data between the CPU 11 and the PC 3.

The operation panel 24 includes a key input section, a display section, and the like. The key input section accepts various user-entered instructions for the CPU 11. The display section displays various information to be notified to users.

The CPU 11 operates according to the control program stored in the ROM 12 to implement control means. In addition to general means known to a digital compound machine, the control means includes mode changeover means, continued specification acceptance means, scan method selection means, storage control means, conditional specification acceptance means, and condition setup means.

The mode changeover means performs build job processing to be described later only when a request is made to scan a series of documents using both the ADF scan function and the manual-feed scan function.

During build job processing, the continued specification acceptance means accepts a specification whether to continue scanning documents after a single document scan operation is complete.

During build job processing, the scan method selection means selects one of the ADF scan function and the manual-feed scan function based on a state how the document is placed in the document tray and starts scanning the document according to the selected function.

The above-mentioned continued specification acceptance means generates image data until an instruction to complete the document scan is accepted. The storage control means stores the generated image data as that for a series of documents in the image memory 14.

The conditional specification acceptance means accepts specifications of given scan conditions such as image quality and density while the above-mentioned continued specification acceptance means awaits a specification whether to continue scanning the document.

The condition setup means controls document scanning when the above-mentioned continued specification acceptance means accepts the specification to continue scanning the document. Namely, the condition setup means specifies scanning according to the scan condition updated by the specification most recently accepted by the above-mentioned conditional specification acceptance means.

The following describes operations of the thus configured digital compound machine according to processing steps of the CPU 11.

Figure 2:
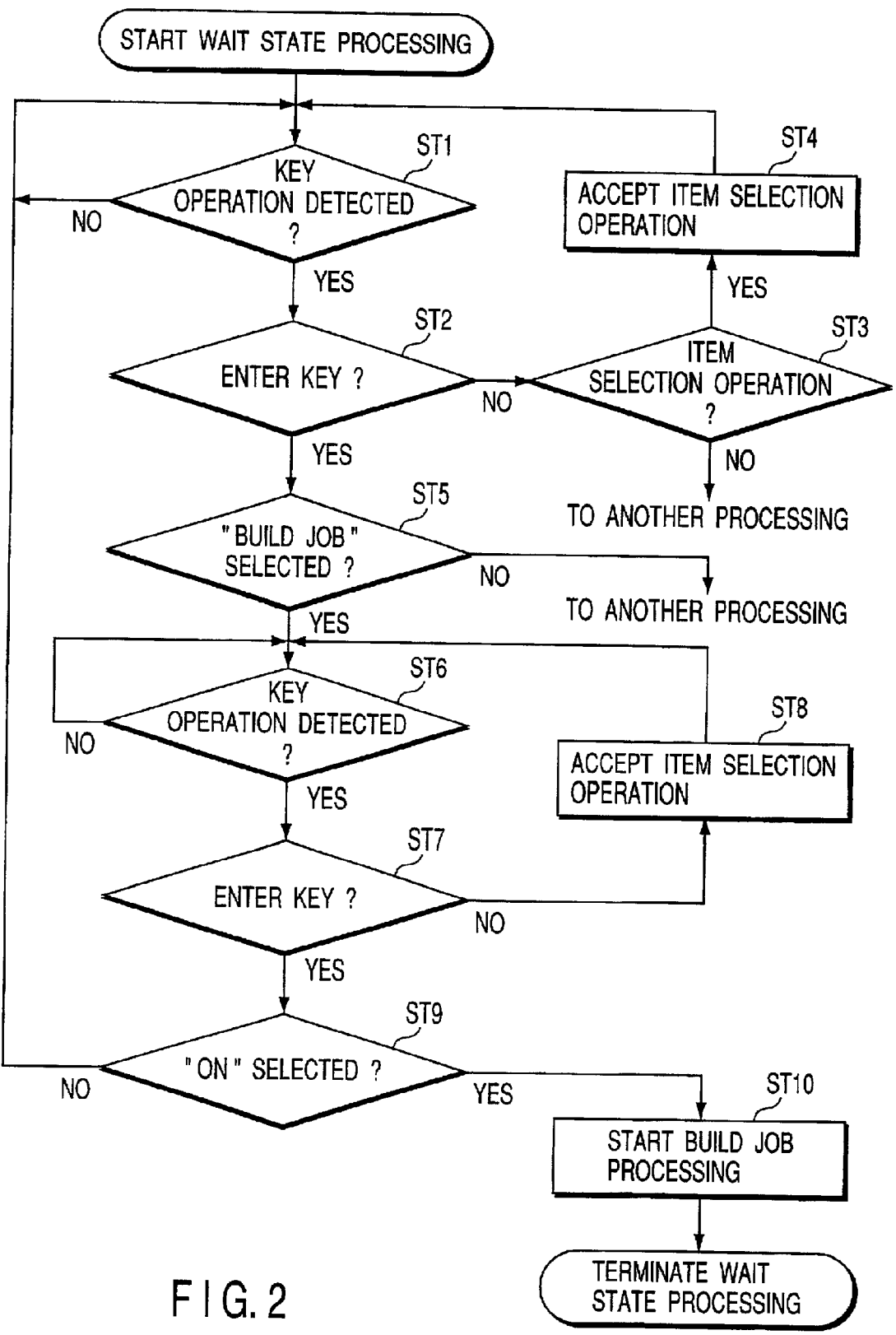
FIG. 2 is a flowchart showing a sequence of steps during wait state processing by CPU in FIG. 1.

When terminating a job to enter a wait state, the CPU 11 starts wait state processing as shown in FIG. 2.

Figure 3:
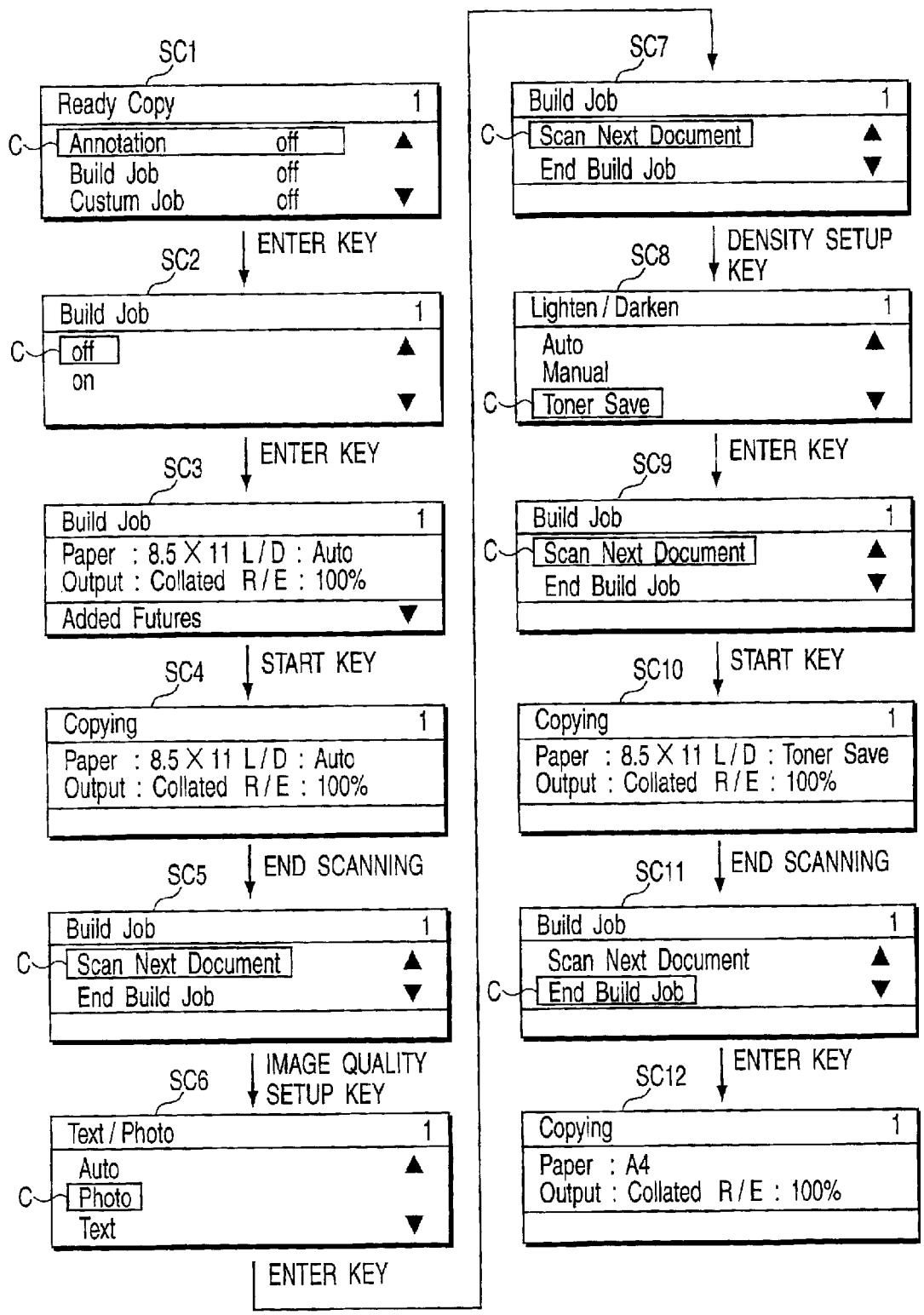
FIG. 3 exemplifies a transition of screens in a display section on an operation panel in FIG. 1.

During this wait state processing, the CPU 11 first waits until a user initiates a key operation on the operation panel 24 (step ST1). At this time, the display section of the operation panel 24 shows a screen SC1 as shown in FIG. 3. A box marked with "C" in FIG. 3 signifies a cursor displayed in each screen.

With this state, when a user performs any key operation on the operation panel 24, the CPU 11 determines whether the key operation is a press of the Enter key or an item selection (steps ST2 and ST3). When the key operation is neither a press of the Enter key or an item selection, the CPU 11 passes control to other processing according to the key operation.

When a user performs an item selection operation such as a key press for selecting items forward or backward, for example, the CPU 11 accepts that item selection operation. At this time, the cursor display position changes on the screen SC1 according to the accepted item selection operation (step ST4). At this step, the CPU accepts operations for selecting any one of special functions such as page addition, build job, and mode memory.

Thereafter, the CPU 11 returns to a key operation wait state at step ST1.

When the CPU 11 maintains the wait state at step ST1, pressing the Enter key allows the CPU 11 to determine whether the selected item is a build job (step ST5). When no build job is selected, the CPU 11 passes control to other processing according to the selected item.

When a build job is selected, the CPU 11 then waits until the Enter key is pressed or an item is selected on the operation panel 24 (steps ST6 and ST7). At this time, the display section of the operation panel 24 shows a screen SC2 in FIG. 3.

When a user performs an item selection operation, the CPU 11 accepts that item selection operation (step ST8). At this time, the cursor display position changes on the screen SC2 according to the accepted item selection operation. Namely, the CPU accepts the operation for turning on or off the build job.

When the Enter key is pressed, the CPU 11 then checks if the selected item is turned ON (step ST9). Only when the ON item is selected, the CPU 11 initiates build job processing (step ST10), and then terminates the wait state processing. When the OFF item is selected, the CPU 11 returns control to step ST11.

Figure 4:
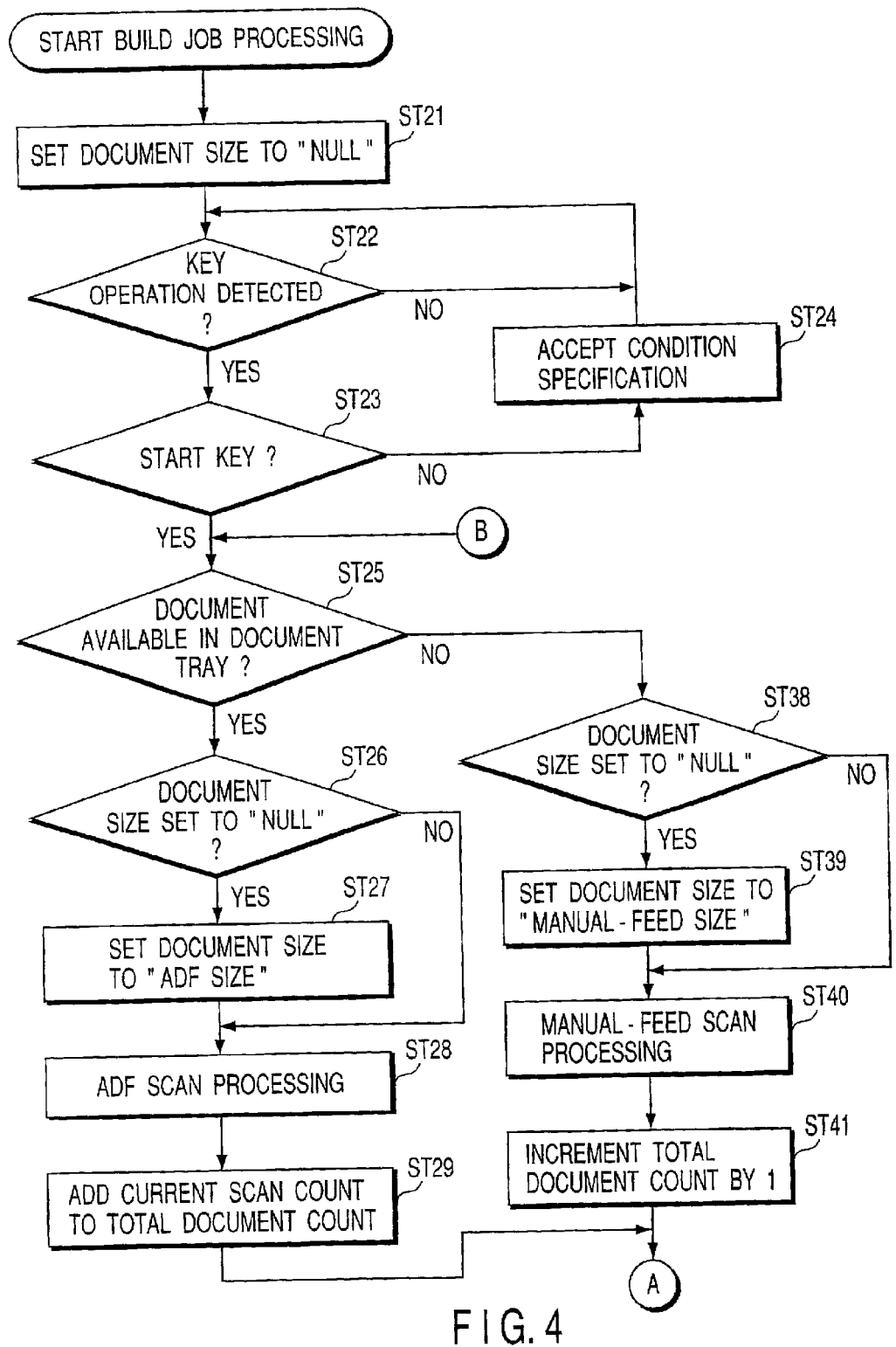
FIG. 4 is a flowchart showing a sequence of steps during build job processing by CPU in FIG. 1 (part 1 of 2)
Figure 5:
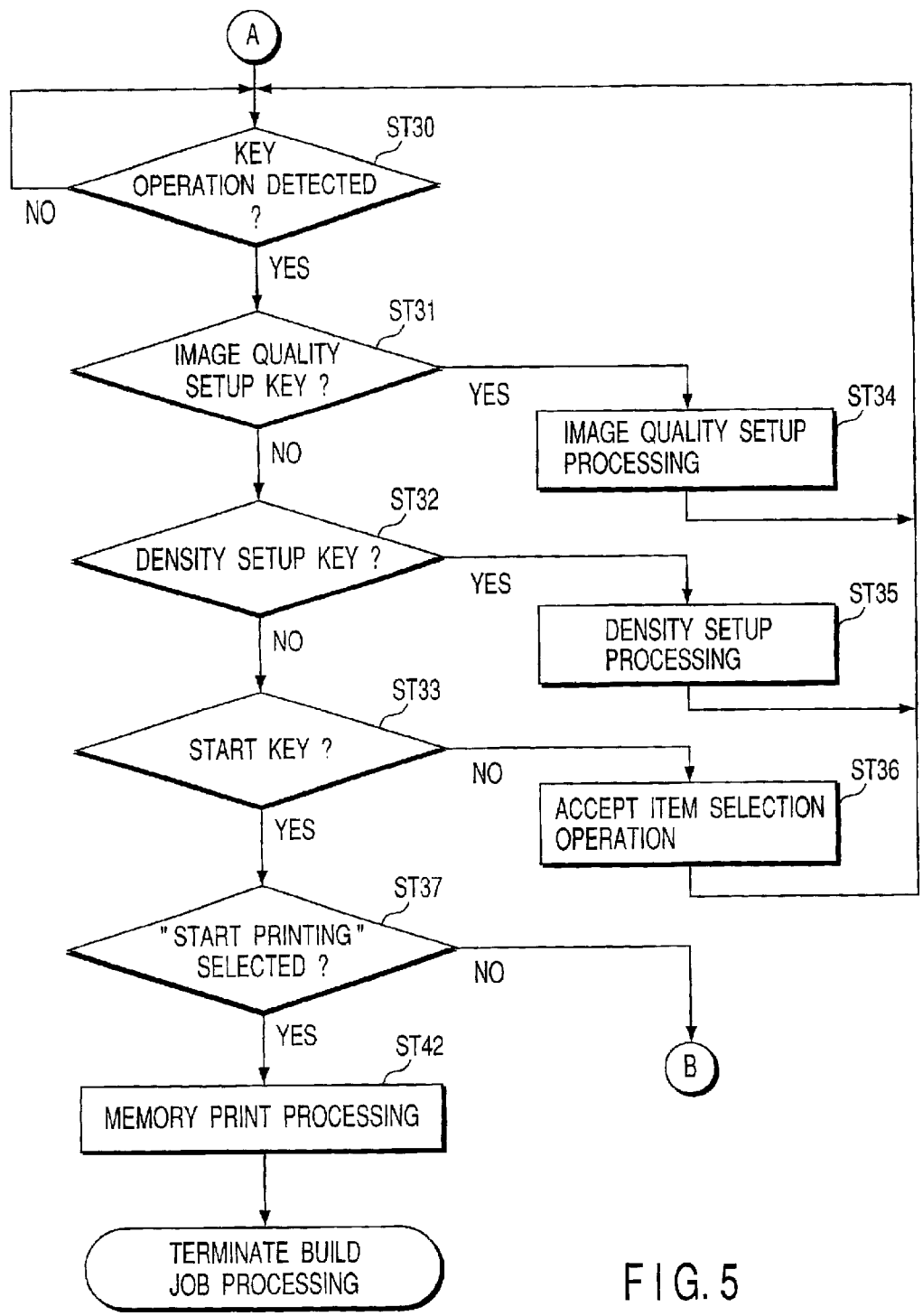
FIG. 5 is a flowchart showing a sequence of steps during build job processing by CPU in FIG. 1 (part 2 of 2)

When the build job processing is initiated during the above-mentioned wait state processing, the CPU 11 executes the build job processing as shown in FIGS. 4 and 5.

The build job processing is described below in detail under these conditions. Namely, a user attempts to make a copy of a new series of documents comprising a series of one or more sheet documents appended by one sheet of a book document. A series of sheet documents is scan according to a default scan condition, that is, by using the ADF scan function. A book document is scan according to scan conditions of "Photo" as the image quality and "Toner Save" as the density by using the manual-feed scan function.

When the build job processing starts, the CPU 11 first initializes the document size to "NULL" (step ST21 in FIG. 4). The CPU 11 then waits until the user performs a key operation on the operation panel 24 (step ST22). At this time, the display section of the operation panel 24 shows a screen SC3 in FIG. 3. This screen SC3 shows the default copy conditions.

With this state, when a user performs any key operation on the operation panel 24, the CPU 11 determines whether the key operation is a press of the Start key (step ST23). The user can change or set the image quality or the density by operating the image quality setup key or the density setup key on the operation panel. When any of these keys other than the Start key is pressed, the CPU 11 passes control to processing for accepting copy condition specification (step ST24) and accepts the specification for changing the copy condition. If needed, the CPU 11 changes the screen for the display section in the operation panel 24. Thereafter, the CPU 11 returns to the key operation wait state at step ST22.

Since the user initially attempts to perform scanning by using the default condition, the user presses the Start key without specifying conditions. When the Start key is pressed, the CPU 11 checks if the document is mounted in the document tray (step ST25).

In this case, the user attempts to scan a series of one or more sheet documents by using the ADF scan function. The user should mount the sheet documents in the document tray before pressing the Start key.

Accordingly, the CPU 11 can determine that the document tray contains documents at step ST25. In this case, the CPU 11 checks if the document size is set to "NULL" (step ST26). When the document size is set to "NULL" for the first document scanning in the current build job, the CPU 11 sets the document size to "ADF Size" (step ST27). When the document size is already set to a value other than "NULL", the CPU 11 uses the specified document sizes as is. Since the scan operation is to take place for the first time, the document size is set to "ADF Size".

The CPU 11 then performs ADF scanning processing for scanning documents by using the ADF scan function (step ST28). This ADF scanning processing is widely known. Namely, the document transport mechanism section 18 transports sheet documents one by one from the document tray onto the document glass plane. The sheet document placed on the document glass plane is scan with vertical scanning by the image sensor drive mechanism section 17 and with horizontal scanning by the image sensor 15. The image memory 14 stores image data generated from the image sensor 15 and the image processing section 16. When the image memory 14 already stores image data during the current build job, the image memory 14 manages newly generated image data by assuming that it follows the already stored image data.

Normally, this ADF scanning processing continues until all sheets documents in the document tray are completely scan. When the user interrupts the processing, scan operations up to that point are validated. When the ADF scanning processing terminates according to either of these methods, the CPU 11 continues the following processing.

While the ADF scanning processing is executing, the display section in the operation panel 24 displays a screen SC4 in FIG. 3.

When the ADF scanning processing terminates, the CPU 11 updates the total document count by adding to it a scan document count after the current ADF scanning processing. The total document count is reset to 0 when the current build job processing starts.

The CPU 11 then waits until the user performs a key operation on the operation panel 24 (step ST30 in FIG. 5). At this time, the display section of the operation panel 24 shows a screen SC5 in FIG. 3.

With this state, when the user performs any key operation on the operation panel 24, the CPU 11 determines whether the key operation is a press of the image quality setup key, the density setup key, or the Start key (steps ST31 through ST33).

The user then scans a book document by changing the scan conditions. Of these conditions, the image quality is changed to "Photo" and the density is changed to "Toner Save".

When the image quality setup key is pressed for changing the image quality, the CPU 11 performs image quality setup processing (step ST34). During this processing, the display section in the operation panel 24 shows a screen SC6 in FIG. 3. The CPU 11 accepts the user-specified Auto, Photo, or Text mode as the image quality. Pressing the Enter key determines the selected mode to take effect during a subsequent document scan operation.

Here, the user selects the photo quality by positioning the cursor to "Photo" as shown by a screen SC6 in FIG. 3. Then, pressing the Enter key determines the Photo mode to be used for a subsequent document scan operation. When the image quality setup processing terminates, the CPU 11 returns to the key operation wait state at step ST30. Accordingly, the display section in the operation panel 24 shows a screen SC7 in FIG. 3.

When the density setup key is pressed for changing the density, the CPU 11 performs density setup processing (step ST35). During this processing, the display section in the operation panel 24 shows a screen SC8 in FIG. 3. The CPU 11 accepts the user-specified Auto, Manual, or Toner Save mode as the density. Pressing the Enter key determines the selected mode to take effect during a subsequent document scan operation.

Here, the user selects the "toner save" density by positioning the cursor to "Toner Save" as shown by a screen SC8 in FIG. 3. Then, pressing the Enter key determines the Toner Save mode to be used for a subsequent document scan operation. When the density setup processing terminates, the CPU 11 returns to the key operation wait state at step ST30. Accordingly, the display section in the operation panel 24 shows a screen SC9 in FIG. 3.

The key operation wait state at step ST30 allows acceptance of an item selection operation for scanning the next document or starting a print job. When none of the image quality setup key, the density setup key, and the Start key is pressed, the CPU 11 accepts the item selection operation (step ST36). The display position of the cursor on the screen SC9 changes according to the accepted item selection operation.

The user chooses "Scan Next Document" as an item selection operation, places the book document on the document glass plane for scanning the document, and then presses the Start key.

The CPU 11 accepts the item selection operation for Scan Next Document at step ST36, and then identifies a press of the Start key at steps ST30 and ST33. Based on these conditions, the CPU 11 checks if Start Printing is selected (step ST37).

Since the Scan Next Document option is selected, the CPU 11 determines that no print job is to start, and then passes control to step ST25. At this time, the book document is placed on the document glass plane and no document is mounted in the document tray. The CPU 11 determines that the document tray contains no document at step ST25.

The CPU 11 then checks if the document size is set to "NULL" (step ST38). The document size is set to "NULL" when the current build job scans a document for the first time. In this case, the CPU 11 sets the document size to "Manual-feed Size" (step ST39). When the document size is set to a value other than "NULL", the CPU 11 uses this value as is. Here, the document size is set to "ADF Size", the CPU 11 assumes the document size to be "ADF Size" as is without performing processing at step ST39.

The CPU 11 then performs manual-feed processing for scanning documents by using the manual-feed scan function (step ST40). This manual-feed processing is widely known. The sheet document placed on the document glass plane is scan with vertical scanning by the image sensor drive mechanism section 17 and with horizontal scanning by the image sensor 15. In the manual-feed processing, the document transport mechanism section 18 does not operate. The image memory 14 stores image data generated by the image sensor 15 and the image processing section 16. When the image memory 14 already stores image data during the current build job, the image memory 14 manages newly generated image data by assuming that it follows the already stored image data.

While the manual-feed processing is executing, the display section in the operation panel 24 displays a screen SC10 in FIG. 3.

When the manual-feed processing terminates, the CPU 11 updates the total document count by incrementing the total document count by "1" (step ST41). This value corresponds to a scan document count resulting from the current manual-feed processing. The CPU 11 then proceeds to a key operation wait state at step ST30. Accordingly, the display section in the operation panel 24 shows a screen SC11 in FIG. 3.

The user can repeat a document scan operation by setting or changing the image quality or the density as needed. At this time, however, all documents have been scan successfully. The user chooses to start printing as an item selection operation, and then presses the Start key.

After accepting an item selection operation for starting a print job at step ST36, the CPU 11 identifies a press of the Start key at steps ST30 and ST33.

At step ST37, the CPU 11 determines that the Start Printing option is selected, and then executes memory print processing (step ST42). During this processing, the CPU 11 uses the printer 19 to print each of a sequence of image data stored during the current build job processing in the image memory 14. Namely, when a plurality of scan operations is performed, the printer 19 is used to print each image data generated during each of a plurality of these scan operations. During the memory print processing, the display section in the operation panel 24 shows a screen SC12 in FIG. 3.

When the print job terminates, the CPU 11 also terminates the current build job processing.

According to this embodiment as mentioned above, when a scan operation is initiated, either the ADF scan function or the manual-feed scan function is selected. The selected function is used for scanning documents. Each time a document scan operation terminates, the CPU accepts user specification whether to continue scanning documents. When a continued scan operation is specified, either the ADF scan function or the manual-feed scan function is selected. The selected function is used for scanning documents. Subsequently, generated image data is stored in the image memory 14 so that the newly generated data is appended to the existing image data generated by document scan operations performed so far. When a print job is initiated, a sequence of image data stored in the image memory 14 is printed as a sequence of copied documents.

Accordingly, a user can prepare a combination of documents which are suitable for scanning with the ADF scan function and with the manual-feed scan function. It is possible to produce a sequence of copies of these documents. For doing this, each time an ADF or manual-feed scan operation is complete, each document is placed in the document tray or on the document glass plane in an intended order of the copied documents. Further, an instruction to scan the next document is issued. When all documents have been scan, it is possible to print intended copy documents by issuing an instruction to start printing.

The image data for a sequence of copied documents is all stored in the image memory 14. When printing a plurality of copies, a software-controlled print sequence can be used to output copied documents in various manners such as collating and stacking without using a mechanical sorter. The user need not manually rearrange output copied documents.

This embodiment automatically determines whether to use the ADF scan function or the manual-feed scan function for scanning documents according to states how documents are placed. The user just needs to place documents and start scanning, thereby alleviating a user's work load.

This embodiment uses build job processing for printing a sequence of copy documents by means of a plurality of scan operations as mentioned above. The build job processing works in a special mode. This mode activates the processing only when a user chooses it. A normal mode can be a user-operated simple mode in which, say, a print job automatically starts just after a document is scan.

This embodiment also accepts specification of scan conditions when accepting user specification whether to scan the next document or start printing. When a scan condition is specified, the condition for the subsequent scan operation is changed to the newly specified condition. It is possible to perform scan operations according to conditions appropriate to respective document states.

In this embodiment, the build job processing continues if an ADF scan operation is interrupted, allowing a new document scan operation to continue. When a sheet document should be copied after a book document, for example, a user may inadvertently place that sheet document in the document tray together with the other sheet documents which should be copied before the book document. In this case, the user can interrupt the book document scan operation by suspending the ADF scan operation at a proper timing. This provides flexible operations.

(Second Embodiment)

Figure 6:
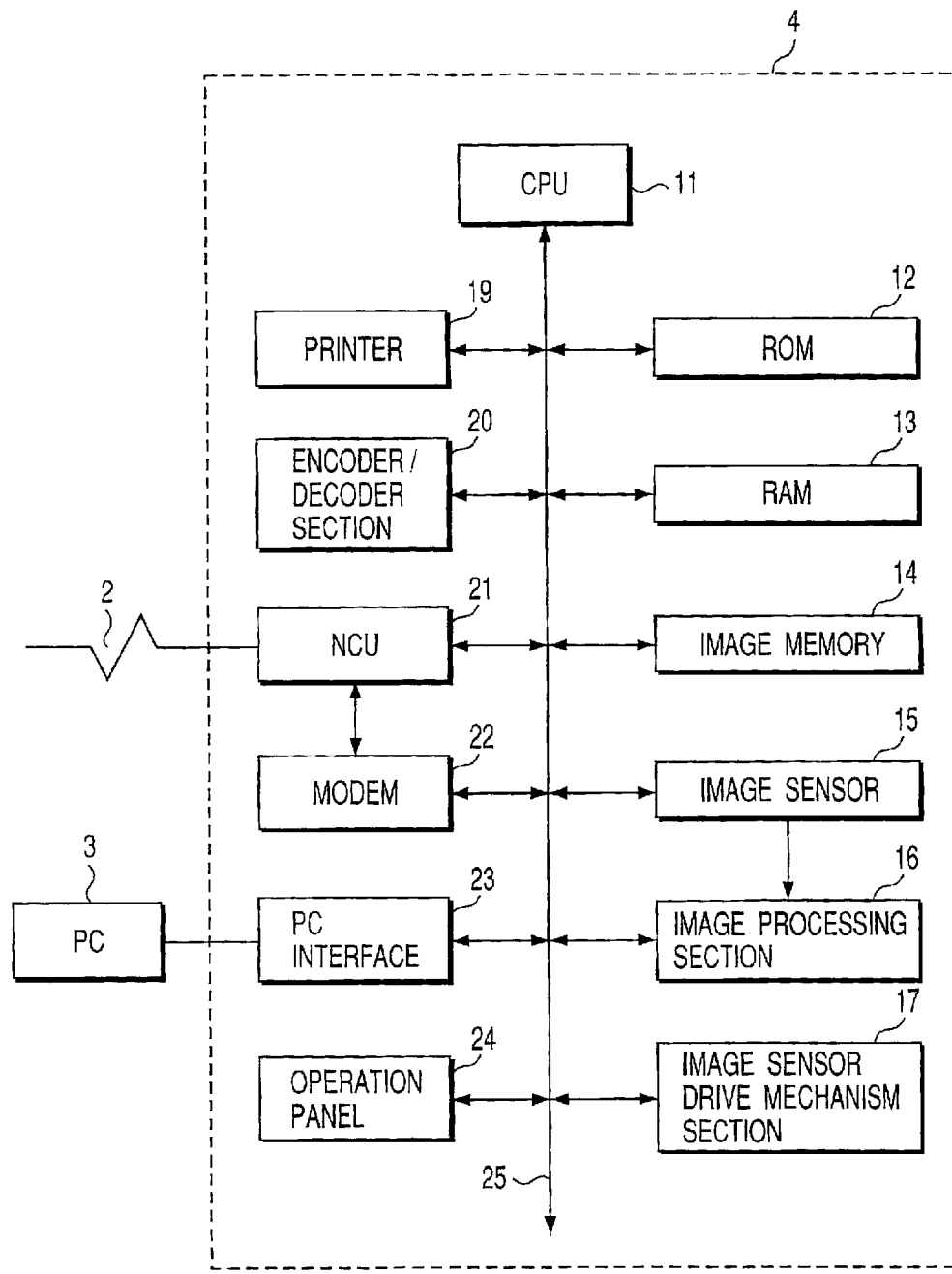
FIG. 6 is a block diagram showing a partial configuration of a second embodiment of a digital compound machine which uses a document scanning apparatus according to the present invention.

FIG. 6 is a block diagram showing a partial configuration of a second embodiment of a digital compound machine. In this embodiment, same components as those in FIG. 1 are marked with the same numerals. The detailed description thereof is omitted.

In this figure, the digital compound machine according to this embodiment is enclosed in a broken line and is marked with numeral 4.

As shown in this figure, a digital compound machine 4 according to this embodiment comprises a CPU 11, ROM 12, RAM 13, image memory 14, an image sensor 15, an image processing section 16, an image sensor drive mechanism section 17, a printer 19, a encoder/decoder section 20, a network control unit 21, a modem 22, a PC interface 23, and an operation panel 24. These components are connected to each other via a system bus 25 to configure the digital compound machine.

Namely, the digital compound machine 4 according to this embodiment is equivalent to the digital compound machine 1 according to the first embodiment void of the document transport mechanism section 18. The digital compound machine 4 has no ADF scan function and is only provided with the manual-feed scan function.

The CPU 11 operates according to the control program stored in the ROM 12 to implement control means which differs from the equivalent in the first embodiment. In addition to general means known to a digital compound machine, the control means includes mode changeover means, continued specification acceptance means, conditional specification acceptance means, condition setup means, and storage control means.

The mode changeover means performs build job processing to be described later only when a request is made to scan a series of documents by changing scan conditions.

During build job processing, the continued specification acceptance means accepts a specification whether to continue scanning documents after a single document scan operation is complete.

The conditional specification acceptance means accepts specifications of given scan conditions such as image quality and density while the above-mentioned continued specification acceptance means awaits a specification whether to continue scanning the document.

The continued specification acceptance means may accept the specification of continued document scanning for scanning documents. In this case, the continued scan control means starts scanning based on the scan condition updated by the specification most recently accepted by the conditional specification acceptance means.

Image data is generated until the continued specification acceptance means accepts the specification to complete the document scanning. The storage control means stores this generated image data as that for a series of documents in the image memory 14.

The following describes operations of the thus configured digital compound machine according to processing steps of the CPU 11.

Also in this embodiment, the wait state processing is performed like in the first embodiment as mentioned above. When the build job processing is initiated during the above-mentioned wait state processing, the CPU 11 executes the build job processing as shown in FIGS. 7 and 8.

Figure 7:
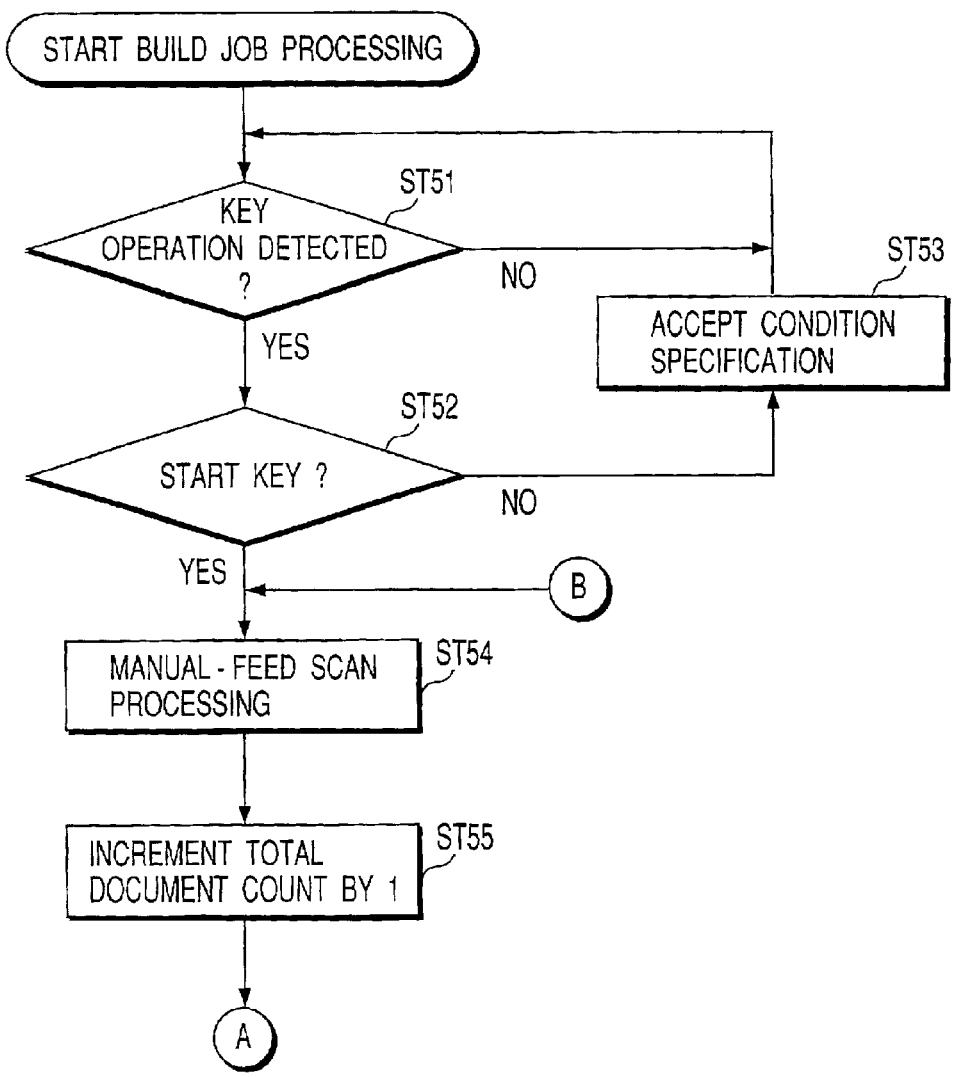
FIG. 7 is a flowchart showing a sequence of steps during build job processing by CPU in FIG. 6 (part 1 of 2)
Figure 8:
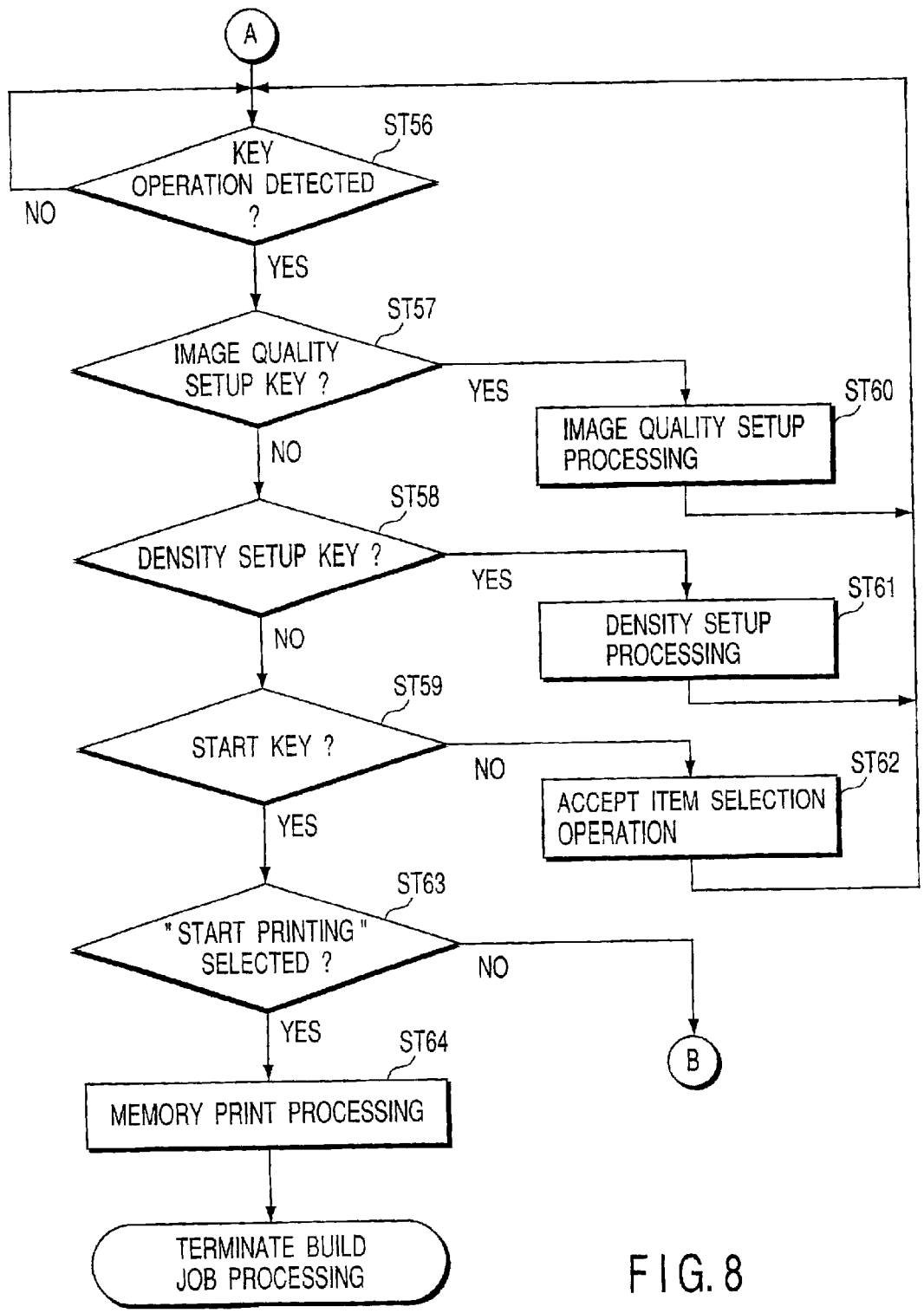
FIG. 8 is a flowchart showing a sequence of steps during build job processing by CPU in FIG. 6 (part 2 of 2).

When the build job processing starts, the CPU 11 first waits until a user initiates a key operation on the operation panel 24 (step ST51 in FIG. 7).

With this state, when a user performs any key operation on the operation panel 24, the CPU 11 determines whether the key operation is a press of the Start key (step ST52). The user can change or set the image quality or the density by operating the image quality setup key or the density setup key on the operation panel. When any of these keys other than the Start key is pressed, the CPU 11 passes control to processing for accepting copy condition specification (step ST53) and accepts the specification for changing the copy condition. If needed, the CPU 11 changes the screen for the display section in the operation panel 24. Thereafter, the CPU 11 returns to the key operation wait state at step ST51.

When the Start key is pressed in the key operation wait state at step ST22, the CPU 11 then performs manual-feed processing for scanning documents by using the manual-feed scan function (step ST54). This manual-feed processing is widely known. The sheet document placed on the document glass plane is scan with vertical scanning by the image sensor drive mechanism section 17 and with horizontal scanning by the image sensor 15. The image memory 14 stores image data generated by the image sensor 15 and the image processing section 16. When the image memory 14 already stores image data during the current build job, the image memory 14 manages newly generated image data by assuming that it follows the already stored image data.

When the manual-feed processing terminates, the CPU 11 updates the total document count by incrementing the total document count by "1" (step ST55). This value corresponds to a scan document count resulting from the current manual-feed processing.

The CPU 11 then waits until the user performs a key operation on the operation panel 24 (step ST56 in FIG. 8). With this state, when the user performs any key operation on the operation panel 24, the CPU 11 determines whether the key operation is a press of the image quality setup key, the density setup key, or the Start key (steps ST57 through ST59).

When the image quality setup key is pressed for changing the image quality, the CPU 11 performs image quality setup processing (step ST60). During this processing, The CPU 11 accepts the user-specified Auto, Photo, or Text mode as the image quality. Pressing the Enter key determines the selected mode to take effect during a subsequent document scan operation.

When the density setup key is pressed for changing the density, the CPU 11 performs density setup processing (step ST61). During this processing, the CPU 11 accepts the user-specified Auto, Manual, or Toner Save mode as the density. Pressing the Enter key determines the selected mode to take effect during a subsequent document scan operation.

The key operation wait state at step ST56 allows acceptance of an item selection operation for scanning the next document or starting a print job. When none of the image quality setup key, the density setup key, and the Start key is pressed, the CPU 11 accepts the item selection operation (step ST62).

To continue scanning documents, the user selects the Scan Next Document option as an item selection operation, places a document on the document glass plane, and then presses the Start key.

The CPU 11 accepts the item selection operation for Scan Next Document at step ST62, and then identifies a press of the Start key at steps ST56 and ST59. Based on these conditions, the CPU 11 checks if Start Printing is selected (step ST63).

Since the Scan Next Document option is selected, the CPU 11 determines that no print job is to start, passes control to step ST54, and then reexecutes the manual-feed processing.

The user can repeat a document scan operation by setting or changing the image quality or the density as needed. When all documents have been scan, the user selects the Start Printing option as an item selection operation, and the presses the Start key.

After accepting an item selection operation for starting a print job at step ST62, the CPU 11 identifies a press of the Start key at steps ST56 and ST59. At step ST63, the CPU 11 determines that the Start Printing option is selected, and then executes memory print processing (step ST64). During this processing, the CPU 11 uses the printer 19 to print each of a sequence of image data stored during the current build job processing in the image memory 14. Namely, when a plurality of scan operations is performed, the printer 19 is used to print each image data generated during each of a plurality of these scan operations.

When the print job terminates, the CPU 11 also terminates the current build job processing.

According to this embodiment as mentioned above, when a scan operation is initiated, the manual-feed scan function is selected for scanning documents. Each time a document scan operation terminates, the CPU accepts user specification whether to continue scanning documents and specify the scan condition. When a continued scan operation is specified, the most recently specified scan condition is used for scanning documents. Subsequently, generated image data is stored in the image memory 14 so that the newly generated data is appended to the existing image data generated by document scan operations performed so far. When a print job is initiated, a sequence of image data stored in the image memory 14 is printed as a sequence of copied documents.

Accordingly, the user can scan documents by combining various scan conditions. When all documents have been scan, it is possible to print intended copy documents by issuing an instruction to start printing.

The image data for a sequence of copied documents is all stored in the image memory 14. When printing a plurality of copies, a software-controlled print sequence can be used to output copied documents in various manners such as collating and stacking without using a mechanical sorter. The user need not manually rearrange output copied documents.

This embodiment uses build job processing for printing a sequence of copy documents by means of a plurality of scan operations as mentioned above. The build job processing works in a special mode. This mode activates the processing only when a user chooses it. A normal mode can be a user-operated simple mode in which, say, a print job automatically starts just after a document is scan.

In this embodiment, the build job processing continues if a scan operation is interrupted, allowing a new document scan operation to continue. This provides flexible operations.

The present invention is not limited to the above-mentioned embodiments. In each of the above-mentioned embodiments, the document scanning apparatus according to the present invention is used for the digital compound machine. However, the document scanning apparatus is applicable to any other devices such as a facsimile machine and a copier. It is also possible to implement the document scanning apparatus as a stand-alone apparatus which outputs generated image data to an external device. Namely, it does not matter how generated image data is used. Accordingly, in the above-mentioned embodiments, the build job processing is available for not only copying, but also facsimile transmission.

Each of the above-mentioned embodiments continues a build job even if a scan operation is suspended. It may be also preferable to terminate the build job concurrently when an ADF scan operation is suspended. This allows a user to suspend a copy operation itself during the ADF scanning with a single suspension instruction, improving user operability.

Each of the above-mentioned embodiments provides the build job processing in the special mode. It may be also preferable to execute the build job processing in the normal mode.

The first embodiment commonly uses the image sensor 15, the image processing section 16, and the image sensor drive mechanism section 17 for ADF and manual-feed scan operations. It may be preferable to use completely different means for ADF and manual-feed scan operations.

The first embodiment determines the ADF scan function or the manual-feed scan function for scanning documents only based on a state how a document is mounted in the document tray. It may be preferable to determine either scan function only based on a state how a document is placed on the document glass plane or based on a state how a document is mounted in the document tray and placed on the document glass plane. It is not necessarily to automatically determine the ADF scan function or the manual-feed scan function for scanning documents. It may be preferable to allow a user to determine which function to take precedence over the other.

The second embodiment proposes the document scanning apparatus having only the manual-feed scan function. It is possible to provide a document scanning apparatus having only the ADF scan function.

It is further understood by those skilled in the art that various changes and modifications may be made in the present invention without departing from the spirit and scope thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document scanning apparatus for scanning a document, generating image data, and storing the image data, comprising:

first scanning means for sequentially transporting documents mounted in a document tray to a scan position and scanning the documents at the scan position, thereby generating image data corresponding to the documents;

second scanning means for scanning a document placed on a document glass plane without transporting the document, thereby generating image data corresponding to the document;

continued instruction acceptance means for accepting an instruction for one of continuation of document scanning and completion of document scanning after one of: (i) the first scanning means scans all documents mounted in the document tray and (ii) the second scanning means scans the document placed on the document glass plane;

selection means for responding to the instruction for continued document scan, accepted by the continued instruction acceptance means, and for selecting the first scanning means or the second scanning means according to a predetermined rule, and for allowing selected scanning means to start scanning additional documents; and storage control means for storing newly generated image data corresponding to the additional documents as additional image data subsequent to previously stored image data, wherein the first scanning means or the second scanning means provides the newly generated image data until the continued instruction acceptance means accepts the instruction for completing the scanning of documents.

2. The document scanning apparatus according to claim 1, wherein the continued instruction acceptance means accepts an instruction whether to continue scanning documents based on a specified suspension instruction also in response to a suspended scan operation performed by the first scanning means or the second scanning means.

3. The document scanning apparatus according to claim 1, further comprising mode changeover means which validates operations of the continued instruction acceptance means, the selection means, and the storage control means only when a specified mode is enabled for the first scanning means and the second scanning means.

4. The document scanning apparatus according to claim 1, further comprising:
- conditional instruction acceptance means which accepts an instruction of a specified scan condition when the continued instruction acceptance means awaits an instruction whether to continue scanning documents; and
- condition setup means which allows the first scanning means or the second scanning means to perform scanning under a scan condition updated by an instruction most recently accepted by the conditional instruction acceptance means when one of the first scanning means and the second scanning means performs document scanning in response to acceptance of an instruction to continue scanning documents by the continued instruction acceptance means.

5. A document scanning apparatus for scanning a document, generating image data, and storing the image data in, comprising:
- scanning means for scanning the document, thereby generating image data corresponding to the document;
- continued instruction acceptance means for accepting an instruction for continuation of document scanning or completion of document scanning after termination of scanning of the document by the scanning means;
- conditional instruction acceptance means for accepting an instruction of a specified scan condition when the continued instruction acceptance means awaits an instruction whether to continue scanning documents;
- continued scan control means for allowing the scanning means to start scanning additional documents under a scan condition updated by an instruction most recently accepted by the conditional instruction acceptance means in response to acceptance of an instruction to continue scanning documents by the continued instruction acceptance means; and
- storage control means for storing newly generated image data corresponding to the additional documents as additional image data subsequent to previously stored image data, wherein the scanning means provides the newly generated image data until the continued instruction acceptance means accepts the instruction for completion of scanning documents.

6. The document scanning apparatus according to claim 5, wherein the continued instruction acceptance means accepts an instruction whether to continue scanning documents based on a specified suspension instruction also in response to a suspended scan operation performed by the scanning means.

7. The document scanning apparatus according to claim 5, further comprising mode changeover means which validates operations of the continued instruction acceptance means, conditional instruction acceptance means, continued scan control means, and the storage control means only when a specified special mode is enabled for the scanning means for.

8. A document scanning method of scanning a document, generating image data, and storing the image data by selectively using one of: (i) first scanning means for sequentially transporting documents mounted in a documents tray to a scan position and scanning the document at the scan position thereby generating image data corresponding to the documents, and (ii) second scanning means for scanning a document placed on a document glass plane without transporting the document thereby generating image data corresponding to the document, said method comprising:
- accepting an instruction for continuation of document scanning or completion of document scanning after one of: (i) the first scanning means scans all documents mounted in the document tray and (ii) the second scanning means scans the document placed on the document glass plane;
- responding to an acceptance of the continued document scan instruction, selecting the first scanning means or the second scanning means according to a predetermined rule, and allowing selected scanning means to start scanning additional documents; and
- storing newly generated image data corresponding to the additional documents as additional image data subsequent to previously stored image data, wherein the first scanning means or the second scanning means provides the newly generated image data until acceptance of the instruction to complete scanning documents.

9. A document scanning method for scanning a document, generating image data, and storing the image data by using a scanning means, said method comprising:
- accepting an instruction for continuation of document scanning or completion of document scanning after termination of scanning of the document by the scanning means;
- accepting an instruction of a specified scan condition while awaiting the instruction whether to continue scanning documents;
- allowing the scanning means to start scanning additional documents under a scan condition updated by an instruction most recently accepted in response to acceptance of, specification to continue scanning documents; and
- storing newly generated image data corresponding to the additional documents as additional image data subsequent to previously stored image data, wherein the scanning means provides the newly generated image data until acceptance of the instruction to complete scanning documents.

* * * * *